United States Patent [19]

Richwine

[11] 4,288,576
[45] * Sep. 8, 1981

[54] 2,5-DIMERCAPTO-1,3,4-THIADIAZOLE AS A CROSS-LINKER FOR SATURATED, HALOGEN-CONTAINING POLYMERS

[75] Inventor: John R. Richwine, Newark, Del.

[73] Assignee: Hercules Incorporated, Wilmington, Del.

[ * ] Notice: The portion of the term of this patent subsequent to Dec. 5, 1995, has been disclaimed.

[21] Appl. No.: 53,449

[22] Filed: Jun. 29, 1979

Related U.S. Application Data

[63] Continuation-in-part of Ser. No. 942,856, Sep. 15, 1978, abandoned, which is a continuation-in-part of Ser. No. 842,839, Oct. 17, 1977, abandoned.

[51] Int. Cl.$^3$ ............................ C08F 8/34; C08F 8/30
[52] U.S. Cl. .................................. 525/349; 525/330; 525/331; 525/379
[58] Field of Search ............... 525/349, 346, 331, 330, 525/335; 528/404

[56] References Cited

U.S. PATENT DOCUMENTS

| | | | |
|---|---|---|---|
| 2,983,715 | 5/1961 | Fields | 525/349 |
| 3,787,376 | 1/1974 | Nakamura | 525/349 |
| 3,919,143 | 11/1975 | Morris | 260/18 R |
| 4,128,510 | 12/1978 | Richwine | 525/349 |

FOREIGN PATENT DOCUMENTS

| | | | |
|---|---|---|---|
| 42-19166 | 9/1967 | Japan | 525/349 |
| 974915 | 11/1964 | United Kingdom | 525/349 |

*Primary Examiner*—C. A. Henderson
*Attorney, Agent, or Firm*—Marion C. Staves

[57] ABSTRACT

It has been found that saturated, halogen-containing polymers can be cross-linked to yield stable vulcanizates using 2,5-dimercapto-1,3,4-thiadiazole in the presence of certain basic materials in normal vulcanization procedures.

26 Claims, No Drawings

2,5-DIMERCAPTO-1,3,4-THIADIAZOLE AS A CROSS-LINKER FOR SATURATED, HALOGEN-CONTAINING POLYMERS

This is a continuation-in-part of applicant's copending application Ser. No. 942,856, filed Sept. 15, 1978 now abandoned, which is in turn a continuation-in-part of application Ser. No. 842,839, filed Oct. 17, 1977 now abandoned.

This invention relates to the cross-linking of halogen-containing polymers. More particularly, this invention relates to a method of cross-linking saturated, halogen-containing polymers with 2,5-dimercapto-1,3,4-thiadiazole and certain basic materials.

BACKGROUND OF THE INVENTION 2,5-Dimercapto-1,3,4-thiadiazole is a known compound and has been reported in British Pat. No. 974,915 as a curing agent for certain unsaturated, halogen-containing polymers (i.e., chlorobutyl rubber and polychloroprene elastomers). However, the compositions disclosed in British Pat. No. 974,915 will not cross-link saturated, halogen-containing polymers.

SUMMARY OF THE INVENTION

It has now been discovered that saturated, halogen-containing polymers can be cross-linked to yield stable vulcanizates with good aging, compression set resistance, and insolubility in organic solvents using 2,5-dimercapto-1,3,4-thiadiazole, or a concentrate thereof in a binder material, in the presence of certain basic materials in normal vulcanization procedures. Accordingly, this invention relates to a process of cross-linking saturated, halogen-containing polymers with 2,5-dimercapto-1,3,4-thiadiazole in the presence of a basic material selected from (1) amines having a boiling point above about 110° C. and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolyl-guanidines; and (5) the condensation product of aniline and at least one mono-aldehyde containing one to seven carbon atoms, in combination with at least an equal amount of an inorganic base. The term "pK value" refers to the dissociation constants of bases and acids in aqueous solution. Representative values are shown in the Handbook of Chemistry and Physics, 45th Edition, The Chemical Rubber Co., page D-76 (1964).

DESCRIPTION OF THE PREFERRED EMBODIMENTS

The saturated, halogen-containing polymers to be cross-linked in accordance with this invention contain at least about 2%, most preferably about 5%, by weight of halogen and less than 0.1 mole % ethylenic unsaturation. Typical of the saturated, halogen-containing polymers are homopolymers of epichlorohydrin, copolymers of epichlorohydrin and ethylene oxide or propylene oxide, chlorinated high-density polyethylene, chlorosulfonated polyethylene, poly(vinyl chloride), poly(vinyl fluoride), poly(chloroalkylacrylates), poly(vinylidene chloride), and copolymers of vinylidene fluoride and hexafluoropropylene. In addition, the process of this invention may be used to cross-link blends of saturated, halogen-containing polymers.

Typical amines having a boiling point above about 110° C. and a pK value below about 4.5 are the aliphatic and cycloaliphatic primary, secondary and tertiary amines having 5 to 20 carbon atoms, such as n-hexylamine, octylamine, dibutylamine, tributylamine, trioctylamine, di(2-ethylhexyl)amine, dicyclohexylamine, and hexamethylene diamine. Various amounts of amine can be used, depending upon the degree of cross-linking desired and the presence of inorganic basic material. In general, the amount of amine used will be from about 0.25% to about 10%, more preferably from about 0.5% to about 5%, most preferably from about 1.0% to about 3% based on the weight of the polymer. For economic reasons, it may be desirable to substitute less expensive inorganic basic material for some of the amine. However, at least 0.1% of amine based on the weight of the polymer must be present with any inorganic basic material to obtain cross-linking of the polymer.

Typical salts of amines having pK values below about 4.5 with acids having pK values above about 2.0 are n-butylamine acetate, dibutylamine sorbate, hexamethylenediamine carbamate, and the dicyclohexylamine salt of 2-mercaptobenzothiazole. A special type of salt of an amine with an acid, included in this definition, is the salt of an amine with 2,5-dimercapto-1,3,4-thiadiazole. Various amounts of the said salts can be used, depending upon the degree of cross-linking desired and the presence of inorganic basic material. In general, the amount of salt used will be from about 0.25% to about 10%, more preferably from about 0.5% to about 5%, most preferably from about 1.0% to about 3% based on the weight of the polymer. For economic reasons, it may be desirable to substitute less expensive inorganic basic material for some of the amine salt except for the amine salts of 2,5-dimercapto-1,3,4-thiadiazole. However, at least 0.1% of amine salt based on the weight of the polymer must be present with any inorganic basic material to obtain cross-linking of the polymer.

Diphenyl- and ditolyl-guanidine will be used in the same amounts as recited above for the amines and amine salts.

Typical condensation products of aniline with an acyclic aliphatic mono-aldehyde useful in combination with an inorganic base in this invention are the condensates of aniline with butyraldehyde, the condensates of aniline with heptaldehyde and the condensates of aniline with acetaldehyde and butyraldehyde. Typical inorganic bases used in combination with the above condensates are the alkali metal hydroxides, alkaline earth metal oxides, hydroxides and their salts with weak acids such as sodium hydroxide, sodium carbonate, potassium hydroxide, magnesium oxide, calcium oxide, calcium hydroxide, barium oxide, calcium carbonate, and magnesium carbonate. As stated above, the aniline-aldehyde condensates must be used in combination with at least an equal amount of an inorganic base. Usually the inorganic base will be present in an amount equal to 2 to 5 times the amount of condensate. The condensate will be used in the same amounts as recited above for the amines and amine salts.

In addition to the cross-linking agent and basic material, other ingredients can also be incorporated. The types of additives commonly used in rubber vulcanization can be used, as, for example, extenders, fillers, pigments, plasticizers, softeners, etc. The presence of a filler and, in particular, carbon black, is beneficial and, as in hydrocarbon rubber compounding, gives very advantageous results. There are many cases, however, in which a filler is not required or desired and excellent results are achieved when only the cross-linking agent and basic materials are added. Also, most of the saturated, halogen-containing polymers contain a small amount (i.e., from about 0.1% to about 2% by weight) of antioxidant, added at the time of their preparation. It may be desirable in some cases to add a small additional amount of antioxidant before or at the time of cross-linking the polymer. Exemplary of the preferable antioxidants are phenyl-β-naphthylamine, di-β-naphthyl-p-phenylenediamine, sym-di-β-naphthyl-p-phenylenediamine, N-isooctyl-p-amino phenol, the reaction product of diphenylamine and acetone, polymerized trimethyl-dihydroquinoline, 4,4'-thio-bis-(6-tert-butyl-m-cresol), the reaction product of crotonaldehyde and 3-methyl-6-tert-butyl-phenol, nickel dibutyldithiocarbamate, the zinc salt of 2-mercaptobenzimidazole, and nickel dimethyldithiocarbamate.

Particularly in the case of epichlorohydrin polymers, it may be advantageous to add at least one carboxylic acid to the cross-linkable composition to act as a scorch retarder during the compounding step if calcium oxide or calcium hydroxide is used as an inorganic basic material. Malic acid and N-acetylanthranilic acid are especially useful.

The cross-linking agent, basic material and additives, if any are used, can be incorporated or admixed with the polymer in any desired fashion. For example, they can be uniformly blended with a polymer by simply milling on a conventional rubber mill or mixing in a Banbury mixer. By this means, the cross-linking agent and basic material are uniformly distributed throughout the polymer and uniform cross-linking is effective when the blend is subjected to heat. It is generally preferable to mill at temperatures within the range of from about 20° C. to about 95° C. However, the blends are generally scorch-resistant below about 120° C., unless compounded with a large amount of organic basic material. Other methods of admixing the cross-linking agent with the polymer will be apparent to those skilled in the art.

The conditions under which the cross-linking is effected can be varied over a wide range. Cross-linking can be effected in minutes at elevated temperatures or in days at temperatures slightly above room temperature. In general, the cross-linking temperature will be within the range of from about 30° C. to about 280° C., more preferably from about 135° C. to about 235° C., and most preferably from about 150° C. to about 205° C. The time will vary inversely with the temperature and with concentration of basic material will range from about 30 seconds to 70 hours, preferably from about 30 seconds to about 120 minutes. While the cross-linking process can be conducted in air at normal atmospheric pressure, it will generally be conducted in a metal mold under a compression of at least about 50 p.s.i. or in a steam autoclave at the pressure required for the desired temperature.

For ease in incorporating the 2,5-dimercapto-1,3,4-thiadiazole into the cross-linkable polymer, and to avoid the use of powders in the compounding step, it may be desirable to prepare the 2,5-dimercapto-1,3,4-thiadiazole as a concentrate in a binder or carrier which can be added, along with the basic materials, in small amounts to the polymer composition without adverse effect on the properties of the cross-linked composition. Particularly advantageous binders or carriers are polymers which may or may not be cross-linkable by the cross-linking agent. Suitable materials, in addition to the cross-linkable polymers, are, for example, ethylene-propylene rubber, ethylene-propylene terpolymers, butadiene-styrene rubber, natural rubber, low-density polyethylene, amorphous polypropylene and polyisobutylene. Concentrations of the 2,5-dimercapto-1,3,4-thiadiazole in the binders can vary from about 15% to about 90%, preferably from about 30% to about 75%. Other materials which can advantageously be incorporated in the concentrates are scorch retarders, antioxidants and nonbasic fillers. It is normally undesirable to incorporate the basic material in the concentrate. These polymer concentrates are normally stored and used in the form of sheets, extruded pellets or rods. Other suitable binders or carriers for use in the preparation of such easily handled concentrates are waxes, resins, or other low-melting solids. Typical useful materials are paraffin wax, stearic acid, microcrystalline wax, rosin, rosin esters and hydrocarbon resins.

The cross-linked products of this invention can be utilized to make hoses, tubes, etc., for use as fuel lines carrying hydrocarbon fuels.

The following examples will illustrate the process of cross-linking in accordance with this invention. All parts and percentages are by weight unless otherwise stated.

EXAMPLE 1

This example illustrates the preparation of a concentrate of 2,5-dimercapto-1,3,4-thiadiazole in stearic acid.

The concentrate is prepared by dry blending the ingredients tabulated below, warming the concentrate blend to the melting point of the stearic acid, extruding the melted concentrate blend and cutting the extrudate into rods or pellets.

| Ingredients | Parts |
| --- | --- |
| 2,5-dimercapto-1,3,4-thiadiazole | 66.6 |
| Stearic acid | 16.7 |
| Kaolin clay | 7.5 |
| Polymeric plasticizer | 9.2 |
| Form | white soft pellets |
| Suggested use in cross-linking | epichlorohydrin copolymer |

In the following examples a Farrel Size "B" Banbury mixer is used to compound the formulations. Ingredients are added to the mixer in the order listed in each example.

EXAMPLES 2-4

| Ingredients | Parts | | |
| --- | --- | --- | --- |
| | Example 2 | Example 3 | Example 4 |
| Chlorinated polyethylene (36% chlorine by weight) | 100 | — | 100 |
| Chlorinated polyethylene (48% chlorine by weight) | — | 100 | — |
| Carbon black (reinforcing filler) | 85 | 85 | 85 |
| Magnesium oxide | 4 | 4 | — |
| Dioctyl adipate (plasticizer and softener) | 15 | 15 | 15 |
| Polymerized 1,2-dihydro-2,2,4-trimethylquinoline (antioxidant) | 0.1 | 0.1 | 0.1 |
| Di-ortho-tolylguanidine | 1 | 1 | 4.8 |
| 2,5-Dimercapto-1,3,4-thiadiazole | 1.25 | 1.25 | 1.25 |

The above formulations are cross-linked by heating for 30 minutes at a temperature of 160° C. in a steam autoclave. The cross-linked products have the following physical properties:

|  | Example 2 | Example 3 | Example 4 |
|---|---|---|---|
| Tensile strength (p.s.i.) | 2010 | 2475 | 1950 |
| % Elongation | 200 | 170 | 220 |
| 100% Modulus (p.s.i.) | 1635 | 2315 | 1550 |
| Shore A Hardness | 86 | 91 | 86 |
| % Compression Set (ASTM D-395, Method B) | 66 | 82 | 72 |
| Mooney scorch (at 121° C.) (ASTM D 1646-68) | | | |
| Minimum viscosity | 69 | 56 | 70 |
| Time in minutes for 3 point rise in viscosity | 14.0 | 12.3 | 16.0 |
| Time in minutes for 5 point rise in viscosity | 20.0 | 15.2 | 23.0 |
| Time in minutes for 10 point rise in viscosity | 25.0 | 21.0 | 29.0 |

EXAMPLE 5

| Ingredients | Parts |
|---|---|
| Epichlorohydrin-ethylene oxide copolymer (26% Cl) | 100 |
| Stearic acid (processing aid) | 1 |
| 2,5-Dimercapto-1,3,4-thiadiazole | 1.5 |
| Tributylamine (pK 4.07) (b.p. 216° C.) | 5 |

The above formulation is cross-linked by heating at 160° C. for thirty minutes in an oscillating disc Rheometer (Americal Standard Testing Method D2705-68T). The properties measured are:

| Minimum Torque (inch-pounds) | 6 |
|---|---|
| Torque after 30 minutes (inch-pounds) | 35 |
| Torque after 60 minutes (inch-pounds) | 40 |

EXAMPLES 6-7

| | Parts | |
|---|---|---|
| Ingredients | Example 6 | Example 7 |
| Chlorinated polyethylene (36% chlorine by weight) | 100 | 100 |
| Carbon black (reinforcing filler) | 85 | 85 |
| Dioctyl phthalate (plasticizer and softener) | 20 | 20 |
| Magnesium oxide | 5 | 5 |
| 2,5-Dimercapto-1,3,4-thiadiazole | 1.5 | 1.5 |
| Diphenylguanidine | 1.5 | — |
| Butyraldehyde-aniline reaction product | — | 1.5 |

The above formulations are cross-linked by heating at 160° C. for thirty minutes in a compression mold. The physical properties of the cross-linked products are:

| | Example 6 | Example 7 |
|---|---|---|
| Tensile strength (p.s.i.) | 2070 | 2120 |
| % Elongation | 250 | 240 |
| 100% Modulus (p.s.i.) | 1100 | 1250 |
| Shore A Hardness | 80 | 81 |

EXAMPLE 8

| Ingredients | Parts |
|---|---|
| Poly(vinyl chloride) | 100 |
| Santocizer 160 (phthalate ester plasticizer sold by Monsanto) | 40 |
| Ba-Cd 1203 (coprecipitated Ba-Cd soap stabilizer sold by Ferro Corp.) | 1.2 |
| Calcium carbonate | 20 |
| 2,5-Dimercapto-1,3,4-thiadiazole | 1.2 |
| Butyraldehyde-aniline reaction product | 1 |

The above formulation is heated at 135° C. for thirty minutes in an oscillating disc Rheometer (American Standard Testing Method D2705-68T). Satisfactory cross-linking is obtained without noticeable discoloration.

EXAMPLE 9

| Ingredients | Parts |
|---|---|
| Copolymers of vinylidene fluoride and hexafluoropropylene | 100 |
| Calcium oxide | 5 |
| Di-ortho-tolylguanidine | 3 |
| 2,5-Dimercapto-1,3,4-thiadiazole | 2 |

The above formulation is heated at 160° C. for thirty minutes in an oscillating disc Rheometer (American Standard Testing Method D2705-68T). Satisfactory cross-linking is obtained.

EXAMPLES 10-11

These examples illustrate the pre-reaction of 2,5-dimercapto-1,3,4-thiadiazole with an amine. The reaction product is then used to cross-link a saturated, halogen-containing polymer.

A mixture of 15 grams (0.1 mole) 2,5-dimercapto-1,3,4-thiadiazole and 37 grams (0.2 mole) tributylamine in 200 ml. tetrahydrofuran is heated at 45° C. for 20 minutes. A yellow precipitate results, which is separated from the solution by crystallization, filtered and washed with methylene chloride. The product is dried overnight in a vacuum oven at 50° C. and a pressure of about 18 mm mercury. Analysis of the product indicates a bis salt.

The reaction product obtained above is used to cross-link an epichlorohydrin-ethylene oxide copolymer by formulating as follows:

| | Parts | |
|---|---|---|
| | Example 10 | Example 11 |
| Epichlorohydrin-ethylene oxide copolymer (26% Cl) | 100 | 100 |
| Stearic acid (process aid) | 1 | 1 |
| Barium carbonate | — | 7.5 |
| Reaction product of 2,5-dimercapto-1,3,4-thiadiazole and tributylamine | 5.2 | 5.2 |

The above formulations are cross-linked by heating at 160° C. for thirty minutes in an oscillating disc Rheometer (American Standard Testing Method D2705-68T). The properties measured are:

| | Example 10 | Example 11 |
|---|---|---|
| Minimum torque (inch-pounds) | 7 | 10 |

-continued

|  | Example 10 | Example 11 |
|---|---|---|
| Torque after 30 minutes (inch-pounds) | 48 | 80 |
| Torque after 60 minutes (inch-pounds) | 50 | 81 |

EXAMPLE 12

This example illustrates the cross-linking of chlorinated polyethylene in accordance with this invention in comparison with attempts to cross-link using compositions disclosed in British Patent Ser. No. 974,915.

| Ingredients | a* | b* | c* | d* | e* | f | g | h | i |
|---|---|---|---|---|---|---|---|---|---|
| Chlorinated polyethylene (36% chlorine by weight) | 100 | 100 | 100 | 100 | 100 | 100 | 100 | 100 | 100 |
| Stearic acid | 0.5 | 0.5 | 0.5 | 0.5 | 0.5 | 0.5 | 0.5 | 0.5 | 0.5 |
| High abrasion furnace black | 45 | 45 | 45 | 45 | 45 | 45 | 45 | 45 | 45 |
| Processing Oil | 8 | 8 | 8 | 8 | 8 | 8 | 8 | 8 | 8 |
| Phenyl-β-naphthylamine (antioxidant) | 2 | 2 | 2 | 2 | 6 | 2 | 2 | 2 | 2 |
| 2,5-Dimercapto-1,3,4-thiadiazole | 2 | 2 | 2 | 2 | 2 | 2 | 2 | 2 | 2 |
| Magnesium oxide | — | 4 | — | 4 | 4 | 4 | — | 4 | — |
| Zinc oxide | — | — | 5 | 5 | — | — | 5 | 5 | — |
| Dicyclohexylamine (pK 3.1, b.p. 256° C.) | — | — | — | — | — | 2.5 | 2.5 | 2.5 | 5 |
| The above formulations are heated at 153° C. for thirty minutes in an oscillating disc rheometer (American Standard Testing Method D 2705-68T). | | | | | | | | | |
| Minimum Torque (inch-lbs.) | 22 | 25 | 24 | 24 | 19.3 | 33 | 30 | 27 | 28.5 |
| Torque after 15 minutes | 22.5 | 26 | 25.5 | 24.8 | 20.1 | 88 | 62 | 60 | 127 |
| Torque after 30 minutes | 23.9 | 29 | 29.5 | 26.2 | 23 | 110 | 64 | 64 | 134 |
| Time to 90% cure - minutes | N.C. | N.C. | N.C. | N.C. | N.C. | 20 | 14 | 18 | 11.5 |

*These comparison runs used formulations as disclosed in British Patent No. 974,915 Example III. It can be seen that thiadiazole alone or with basic metal oxide produced N.C. (no cross-linking).

EXAMPLES 13-25

These examples illustrate the cross-linking of chlorinated polyethylene using various organic amines.

A masterbatch was prepared of the following:

|  | Parts |
|---|---|
| Chlorinated polyethylene (36% chlorine by weight) | 100 |
| Stearic acid | 1 |
| High abrasion furnace black | 45 |
| Processing oil | 8 |
| Phenyl-β-naphthylamine (antioxidant) | 1 |
| 2,5-Dimercapto-1,3,4-thiadiazole | 2 |

To portions of the masterbatch were added $2.66 \times 10^{-2}$ moles per 100 parts of polymer of one of the following amines. To other portions of the masterbatch were added 4 parts of magnesium oxide plus the above amount of amine. Each formulation is then heated at 166° C. for twelve minutes in an oscillating disc Rheometer (American Standard Testing Method D2705-68T).

The amines, their boiling points and pK values and the torque (in inch-pounds) of each sample are tabulated below.

| | | | | Thiadiazole alone | | | Thiadiazole plus MgO | | |
|---|---|---|---|---|---|---|---|---|---|
| Example | Amine | b.p. °C. | pK | Minimum Torque | Torque 6 min. | Torque 12 min. | Minimum Torque | Torque 6 min. | Torque 12 min. |
| 13 | Dicyclohexylamine | 256 | 3.1 | 31 | 119 | 109 | 29 | 124 | 133 |
| 14 | Dicyclohexylethylamine | 250 | 3.8 | 22 | 49 | 47 | 19 | 65 | 64 |
| 15 | Cyclohexyldiethylamine | 194 | 3.9 | 20 | 41 | 40 | 19 | 63 | 65 |
| 16 | Benzylmethylamine | 184 | 4.46 | 18 | 40 | 54 | 16 | 41 | 71 |
| 17 | 2-Methylpiperidine | 118 | 3.0 | 21 | 36 | 40 | 18 | 69 | 94 |
| 18 | Di-n-butylamine | 160 | 2.8 | 16 | 58 | 58 | 17 | 84 | 93 |
| 19 | Tri-n-butylamine | 216 | 4.1 | 17 | 45 | 45 | 17 | 62 | 66 |
| 20 | Tri-n-octylamine | 365 | 4.2 | 13 | 46 | 46 | 13 | 34 | 56 |
| 21 | 1,5-Diazobicyclo-[5.4.0]-undec-5-ene | 250 | 2.0 | 29 | 42 | 42 | 30 | 58 | 62 |
| 22 | 1,5-Diazobicyclo-[4.3.0]-non-5-ene | 230 | 2.1 | 25 | 41 | 43 | 24 | 58 | 72 |
| 23 | 2,2'-diethyldihexylamine | 280 | 4.0 | 15 | 73 | 65 | 13 | 94 | 101 |
| 24 | Benzylamine* | 184 | 4.66 | 15 | 19 | 26 | 14 | 18 | 28 |
| 25 | Diethanolamine* | 217 | 5.1 | 12 | 13 | 15 | 16 | 18 | 22 |

*The two amines having a pK value above 4.5 produced no cross-linking.

EXAMPLES 26-28

These examples illustrate the cross-linking of chlorinated polyethylene using various amine salts of 2,5-dimercapto-1,3,4-thiadiazole.

| Ingredients | 26 | 27 | 28 |
|---|---|---|---|
| Chlorinated polyethylene (36% chlorine by weight) | 100 | 100 | 100 |
| Semi-reinforcing furnace black | 80 | 80 | 80 |
| Polymeric plasticizer | 20 | 20 | 20 |

-continued

| Ingredients | 26 | 27 | 28 |
|---|---|---|---|
| Dioctyl adipate (plasticizer) | 10 | 10 | 10 |
| Magnesium oxide | 4 | 4 | 4 |
| Mono(dicyclohexylammonium)-1,3,4-thiadiazole-5-thiol-2-thioate | 2.64 | — | — |
| Bis(dibutylammonium)-1,3,4-thiadiazole-2,5-dithioatemonohydrate | — | 3.28 | — |
| Mono(2,2'-diethyldihexylammonium)-1,3,4-thiadiazole-5-thiol-2-thioate | — | — | 3.12 |

The above formulations are cross-linked by heating for twelve minutes at 166° C. in an oscillating disc rheometer.

| | 26 | 27 | 28 |
|---|---|---|---|
| Minimum Torque (inch-lbs.) | 12 | 10 | 9 |
| Torque after 6 minutes | 41 | 38 | 40 |
| Torque after 12 minutes | 43 | 40 | 47 |

EXAMPLES 29–32

These examples illustrate the cross-linking of various saturated halogenated polymers in accordance with this invention.

| Ingredients | Example 29 a | Example 29 b | Example 29 c | Example 30 a | Example 30 b | Example 30 c | Example 31 a | Example 31 b | Example 32 a | Example 32 b |
|---|---|---|---|---|---|---|---|---|---|---|
| Chlorinated polyethylene - 36% chlorine by weight | 100 | 100 | 100 | — | — | — | — | — | — | — |
| Polyvinyl chloride | — | — | — | 100 | 100 | 100 | — | — | — | — |
| Chlorosulfonated polyethylene | — | — | — | — | — | — | 100 | 100 | — | — |
| Epichlorohydrin homopolymer | — | — | — | — | — | — | — | — | 100 | 100 |
| Alkyl phthalate plasticizer | — | — | — | 40 | 40 | 40 | — | — | — | — |
| Stearic acid (processing aid) | — | — | — | — | — | — | — | — | 3 | 3 |
| Semi-reinforcing furnace black | 80 | 80 | 80 | — | — | — | 40 | 40 | — | — |
| Fast extruding furnace black | — | — | — | — | — | — | — | — | 50 | 50 |
| Aromatic processing aid | 20 | 20 | 20 | — | — | — | — | — | — | — |
| Polymeric plasticizer | 10 | 10 | 10 | — | — | — | — | — | — | — |
| Dioctyl adipate (plasticizer) | 10 | 10 | 10 | — | — | — | — | — | — | — |
| Barium-Cadmium Complex (stabilizer) | — | — | — | 1 | 1 | — | — | — | — | — |
| Magnesium oxide | 5 | 5 | 5 | — | — | — | — | — | — | — |
| Calcium hydroxide | — | — | — | 10 | 10 | — | — | — | 4 | — |
| Calcium carbonate | — | — | — | — | — | — | 10 | — | — | — |
| 2,5-Dimercapto-1,3,4-thiadiazole | 2 | 2 | 2 | — | 2 | 2 | 1.5 | 2 | 1.5 | 2 |
| Dicyclohexylamine (pK 3.1, b.p. 256) | — | — | 2 | 5 | 5 | 5 | 2 | 5 | 1 | 5 |
| Aniline-butyraldehyde condensate | — | 2 | — | — | — | — | — | — | — | — |
| Aniline-acetaldehyde-butyraldehyde condensate | 2 | — | — | — | — | — | — | — | — | — |

The above formulations are heated at the temperature recited below in an oscillating disc rheometer.

| | Example 29 a | Example 29 b | Example 29 c | Example 30 a | Example 30 b | Example 30 c | Example 31 a | Example 31 b | Example 32 a | Example 32 b |
|---|---|---|---|---|---|---|---|---|---|---|
| Temperature, C. | 182 | 182 | 182 | 182 | 182 | 160 | 149 | 160 | 149 | 160 |
| Minimum Torque (inch-lbs.) | 11 | 11 | 13 | 6 | — | 46 | 50 | — | 22 | 15 |
| Maximum Torque (inch-lbs.) | 55 | 56 | 73 | a | 62 | 92 | 100 | 76 | 136 | 147 |
| Time to 90% cure - minutes | 3 | 3 | 6 | N.C. | 1 | 4 | 50 | 0.2 | 9.5 | 1.8 | a = no increase in torque over a period of 30 minutes

What I claim and desire to protect by Letters Patent is:

1. The process of cross-linking a halogen-containing polymer which contains at least about 2% by weight of halogen and less than 0.1 mole % ethylenic unsaturation, which comprises heating said polymer in the presence of 2,5-dimercapto-1,3,4-thiadiazole and a basic material selected from (1) amines having a boiling point above about 110° C. and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolyl-guanidines; and (5) the condensation products of aniline and at least one mono-aldehyde containing one to seven carbon atoms in combination with at least an equal amount of an inorganic base.

2. The process of claim 1 wherein the saturated halogen-containing polymer is a homopolymer of epichlorohydrin.

3. The process of claim 1 wherein the saturated halogen-containing polymer is a copolymer of epichlorohydrin and ethylene oxide.

4. The process of claim 1 wherein the saturated halogen-containing polymer is chlorinated polyethylene.

5. The process of claim 1 wherein the saturated halogen-containing polymer is poly(vinyl chloride).

6. The process of claim 1 wherein the saturated halogen-containing polymer is chlorosulfonated polyethylene.

7. The process of claim 1 wherein the basic material is an amine having a boiling point above about 110° C. and a pK value below about 4.5.

8. The process of claim 7 wherein the amine is selected from primary, secondary and tertiary aliphatic amines containing four to twenty carbon atoms.

9. The process of claim 7 wherein the amine is dicyclohexylamine.

10. The process of claim 7 wherein the amine is 2,2'-diethyldihexylamine.

11. The process of claim 1 wherein the basic material is a salt of an amine having a pK value below about 4.5 with an acid having a pK value above about 2.0.

12. The process of claim 1 wherein the salt is mono(2,2'-diethyldihexylammonium)-1,3,4-thiadiazole-5-thio-2-thioate.

13. The process of claim 1 wherein the basic material is a quaternary ammonium hydroxide or its salt with an acid having a pK value above about 2.0.

14. The process of claim 13 wherein the quaternary ammonium hydroxide is tetrabutylammonium hydroxide.

15. The process of claim 13 wherein the quaternary ammonium hydroxide salt with an acid having a pK value above about 2.0 is tetraethylammonium benzoate.

16. The process of claim 1 wherein the basic material is diphenyl-guanidine.

17. The process of claim 1 wherein the basic material is ditolyl-guanidine.

18. The process of claim 1 wherein the basic material is the condensation product of aniline and at least one mono-aldehyde containing one to seven carbon atoms in combination with at least an equal amount of an inorganic base.

19. The process of claim 18 wherein the condensation product is the condensate of aniline with butyraldehyde.

20. The process of claim 18 wherein the inorganic base is an alkaline earth metal oxide.

21. The process of claim 20 wherein the alkaline earth metal oxide is magnesium oxide.

22. The process of claim 20 wherein the alkaline earth metal oxide is calcium oxide.

23. The process of claim 18 wherein the inorganic base is an alkaline earth metal salt.

24. The process of claim 18 wherein the inorganic base is an alkaline earth metal hydroxide.

25. A saturated halogen-containing polymer containing at least about 2% by weight of halogen and less than 0.1 mole % ethylenic unsaturation cross-linked by heating in the presence of 2,5-dimercapto-1,3,4-thiadiazole and a basic material selected from (1) amines having a boiling point above about 110° C. and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolyl-guanidines; and (5) the condensation products of aniline and at least one mono-aldehyde containing one to seven carbon atoms in combination with at least an equal amount of an inorganic base.

26. A cross-linkable composition comprising (a) a saturated, halogen-containing polymer containing at least about 2% by weight of halogen and less than 0.1 mole % ethylenic unsaturation, (b) 2,5-dimercapto-1,3,4-thiadiazole and (c) a basic material selected from (1) amines having a boiling point above about 110° C. and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolyl-guanidines; and (5) the condensation products of aniline and at least one mono-aldehyde containing one to seven carbon atoms in combination with at least an equal amount of an inorganic base.

* * * * *